United States Patent [19]

Hunt

[11] 3,972,242

[45] Aug. 3, 1976

[54] HYDRAULIC WRENCH

[75] Inventor: Roy C. Hunt, Francisco, Ind.

[73] Assignee: The Standard Oil Company, Cleveland, Ohio

[22] Filed: Aug. 30, 1974

[21] Appl. No.: 502,084

[52] U.S. Cl. .................................................. 74/30
[51] Int. Cl.² .......................................... F16H 19/04
[58] Field of Search ................ 74/30, 156, 159, 160

[56] References Cited

UNITED STATES PATENTS

| | | | |
|---|---|---|---|
| 2,155,497 | 4/1939 | Latil | 74/30 |
| 3,085,452 | 4/1963 | Thompson | 74/30 |
| 3,300,697 | 1/1967 | Woodford | 74/160 |
| 3,531,087 | 9/1970 | Wilson | 74/159 |
| 3,575,057 | 4/1971 | Kurowski | 74/30 |

*Primary Examiner*—Benjamin W. Wyche
*Assistant Examiner*—Wesley S. Ratliff, Jr.
*Attorney, Agent, or Firm*—John F. Jones; Sherman J. Kemmer

[57] ABSTRACT

A high-torque hydraulic wrench useful for tightening and loosening bolts and nuts on heavy machinery is described.

2 Claims, 5 Drawing Figures

FIG. 3
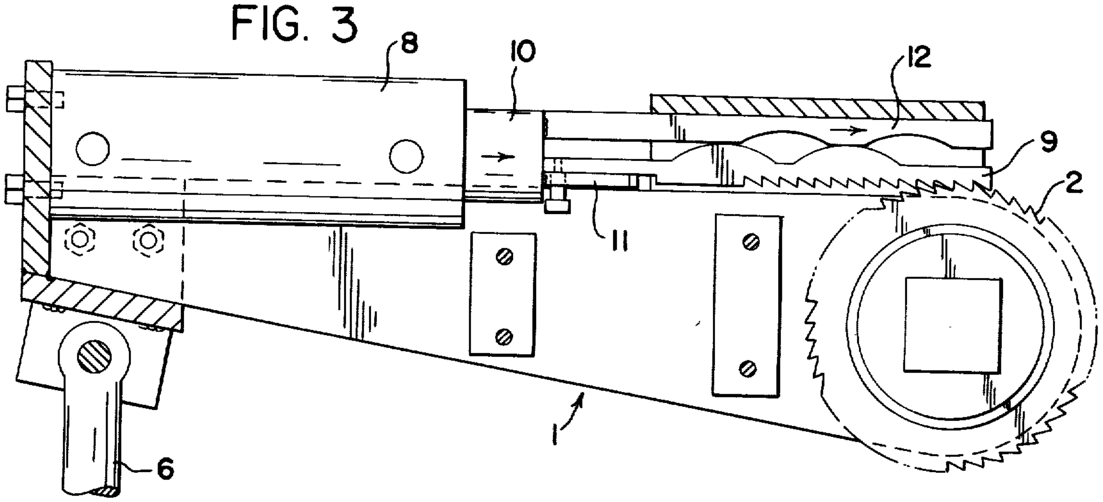
FIG. 4
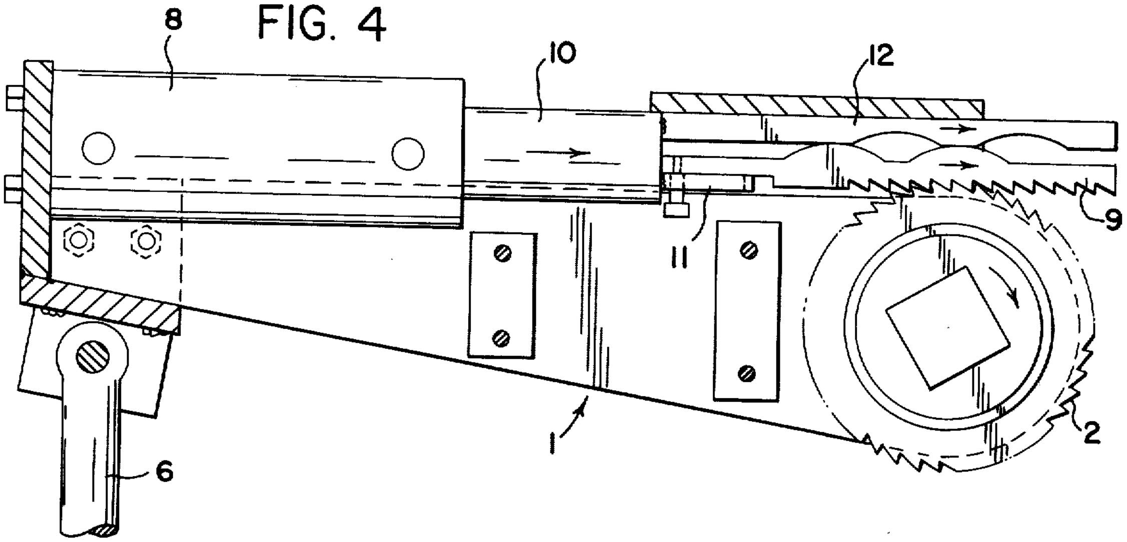
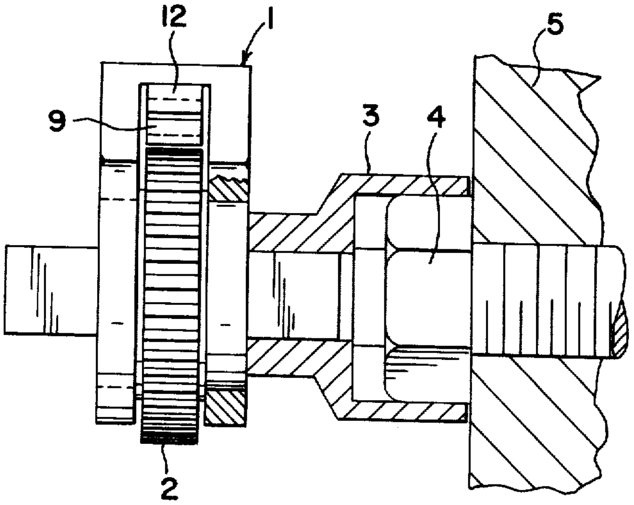
FIG. 5

HYDRAULIC WRENCH

The present invention relates to a hydraulic wrench and more particularly pertains to a hydraulically operated high-torque wrench useful for tightening and loosening bolts and nuts and the like with accurate and efficient use of torque.

The hydraulic wrench of this invention is a relatively slow-speed, high-torque wrench which can be powered by any convenient source of hydraulic power including an electric hand-portable hydraulic pump.

The invention can be better understood by reference to the accompanying drawings showing an illustrative specific embodiment of a hydraulic wrench wherein:

FIG. 3 is also a detailed side elevation view of the wrench partly in section showing another stage in its operation.

FIG. 4 is another detailed side elevation view of the wrench partly in section showing yet another stage in its operation.

FIG. 5 is a view taken along line 5—5 in FIG. 1.

Figure 1:
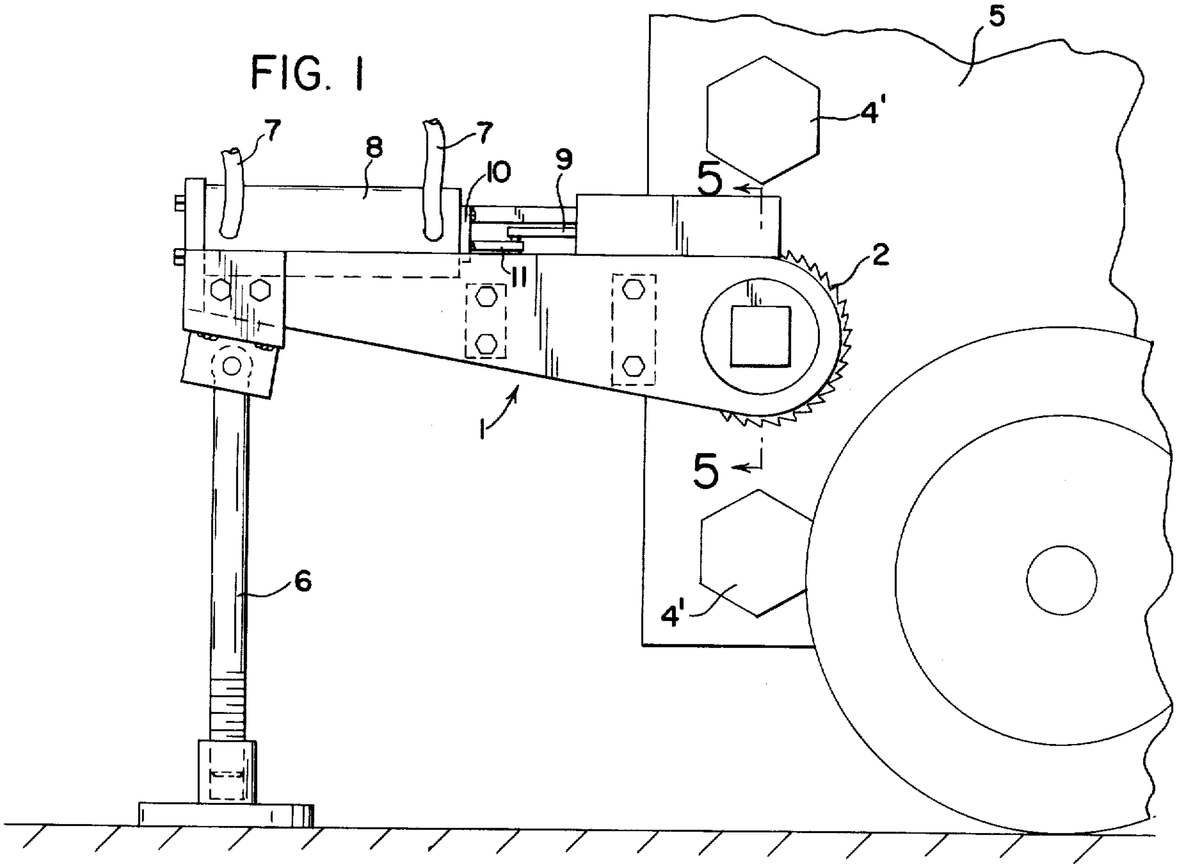
FIG. 1 is a side elevation view of the wrench mounted on a stand and in operating position on a piece of machinery.
Figure 2:
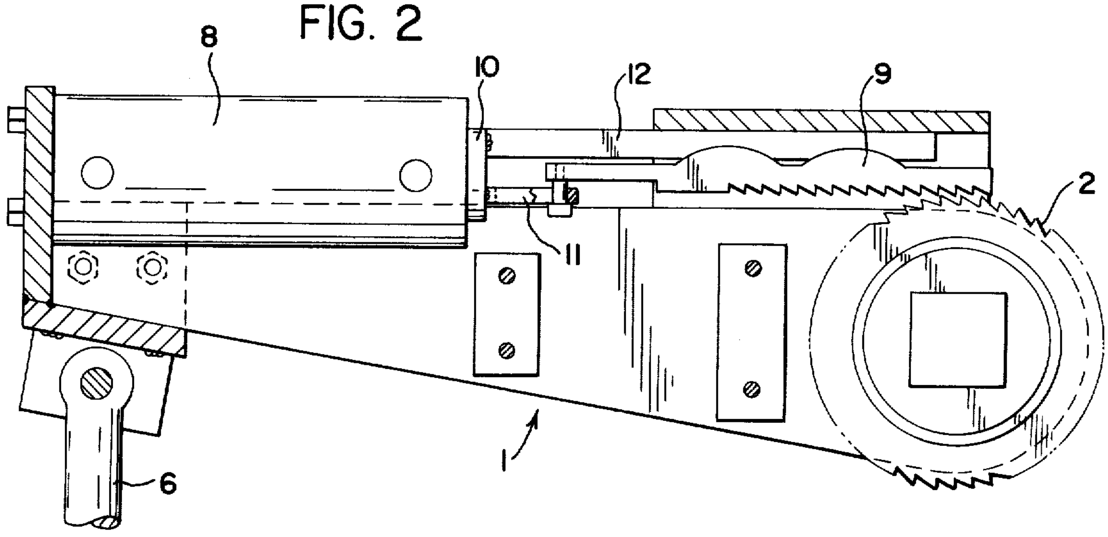
FIG. 2 is a more detailed side elevation view of the wrench partly in section showing one stage in its operation.

The hydraulic wrench 1 is made up of a ratchet 2 which drives the wrench 3 which can have a square, rectangular, triangular, hexagonal, etc., drive for tightening or loosening bolts 4 and 4' located on parts of machinery 5. The hydraulic wrench may be mounted on a supporting stand 6. The source of hydraulic pressure required to operate the hydraulic wrench 1 is supplied through hydraulic hoses 7 which are operationally connected to a double-acting cylinder 8 which moves the rack 9 in a reciprocal track which forward movement causes the teeth of the rack 9 to engage the teeth of the ratchet 2 and causes the ratchet to move in a clockwise fashion when the operator is standing at the handle or base end of the wrench with rack 9 to the left and counterclockwise when the wrench is turned with rack 9 to the right. The rack 9 is a part of the ram 10 of the cylinder which travels forward when the hydraulic pressure is routed in one direction through the hoses 7. In the ram, a retract plate 11 is slotted to allow a lock-down cam 12 to slide on top of the rack 9 forcing it in mesh with the ratchet 2 as shown in FIG. 3. At which time the ram 10 will be in contact with the rack. As the ram 10 is then further extended in the forward direction as shown in FIG. 4, the bolt 4 will be tightened or loosened depending upon which side of the wrench 1 is being used. When the ram 10 reaches the end of travel in the forward direction, a valve on the hydraulic pump (not shown) is then switched to the opposite or retract position which reverses flow of the hydraulic fluid in the cylinder 8 causing the ram 10 to retract. As the ram 10 is retracted, the cam 12 will slide back to the starting position as shown in FIG. 2 allowing the rack 9 to ride over the teeth of the ratchet 2. When the ram 10 has returned to the closed position as in FIG. 1, it has completed one cycle. With the particular embodiment shown in the drawings, it takes four cycles of the ram 10 to rotate the ratchet 2 one complete revolution.

In a specific example, a hydraulic wrench of the type shown in the drawings powered by a 110-volt electric hand-portable hydraulic pump capable of delivering 18 cubic inches per minute of fluid at 10,000 psi gave a slow speed (approximately 1 rpm of the ratchet, high torque of approximately 13,500 feet per pound. The speed can be increased by increased gallons per minute of the pump. Torque foot pounds can be increased by either increasing the size of the cylinder or diameter of the ratchet 2. This particular hydraulic wrench was equipped with a support leg 32 inches long, a 7-inch diameter ratchet gear with a 2-½-inch socket drive through its center, an 11-inch long rack, an 11-inch long lock-down cam, a slotted retract plate and a 20-ton capacity hydraulic cylinder having a 2-½-inch bore and 4-inch stroke powered in two directions.

The hydraulic wrench of this invention is useful for many purposes wherever high torque is required. As was pointed out above, it is highly advantageous in being compact, portable if desired, and delivers extremely high torque for its size. Such a wrench is very useful to maintenance crews servicing heavy machinery such as strip-mining machines, large flange couplings in pipeline transportation stations, underwater applications, and the like.

I claim:

1. A high torque wrench apparatus comprising a rack and ratchet, said ratchet being operatively connected to a wrench, said rack being linearly reciprocally forwardly and backwardly operative by hydraulic means, said rack being part of a hydraulic ram, said ram also being equipped with a lock-down cam, said lock-down cam being slidably raised or lowered by means of a retract plate on respective forward or backward movement of the ram so that when the ram moves in a forward direction the lockdown cam forces the rack to engage and drive the ratchet, and when the ram moves in a backward direction the lock-down cam releases the rack from engagement with the ratchet.

2. The wrench of claim 1 which is supported on a mounting stand.

* * * * *